United States Patent [19]
Gallatin et al.

[11] 3,875,955
[45] Apr. 8, 1975

[54] DIGITAL FLUID FLOW RATE MEASUREMENT OR CONTROL SYSTEM

[75] Inventors: Robert A. Gallatin, Newport Beach; Addison W. Langill, Jr., Balboa, both of Calif.

[73] Assignee: Process Systems, Inc., Salt Lake City, Utah

[22] Filed: Jan. 10, 1974

[21] Appl. No.: 432,158

[52] U.S. Cl. ............... 137/14; 137/487.5; 137/487; 73/205 D; 235/151.34
[51] Int. Cl. ............................................. G01g 1/00
[58] Field of Search ............. 137/1, 487, 487.5, 14, 137/501; 73/205; 235/151.34

[56] References Cited
UNITED STATES PATENTS
2,627,280   2/1953   Adelson ............................. 137/501
3,776,249   12/1973  Wailes et al. ....................... 137/14

OTHER PUBLICATIONS
Brochure, "Self-Optimizing Digital Flow Meter Calibration System," Process Systems, Inc., 356 W. Seventh, South, Salt Lake City, Utah.
Digital Control Valves by Friedland et al., pages 251–264, ISA Transactions, Vol. 8, No. 4, 1969.

*Primary Examiner*—Henry T. Klinksiek
*Attorney, Agent, or Firm*—Christie, Parker & Hale

[57] ABSTRACT

A plurality of individually actuatable, value weighted digital bistable valve elements in parallel interconnect a fluid source to a fluid receiver. A linear relationship is preferably maintained between the resultant fluid flow rate from the source to the receiver and the product of a flow rate determinative fluid parameter times the sum of the weighted values of the digital valve elements in the open state. The fluid parameter is sensed, the states of the digital valve elements are controlled, and a flow rate representative signal is derived from the states of the valve elements and the fluid parameter. If the fluid is liquid, the parameter is the square root of the pressure difference across the valve elements, in the absence of cavitating venturis, and is the square root of the difference between the upstream pressure and the vapor pressure of the liquid in the presence of cavitating venturis. If the fluid is gas, the parameter is the source pressure divided by the square root of the source temperature. For measurement, the states of the digital valve elements are controlled to maintain the value of the fluid parameter constant. For control the states of the digital valve elements are controlled to establish a set point flow rate.

47 Claims, 10 Drawing Figures

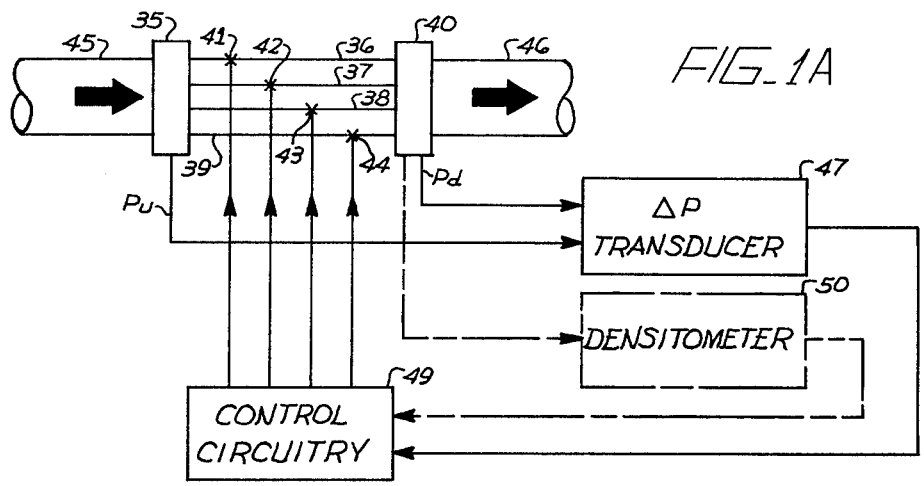
FIG_1A
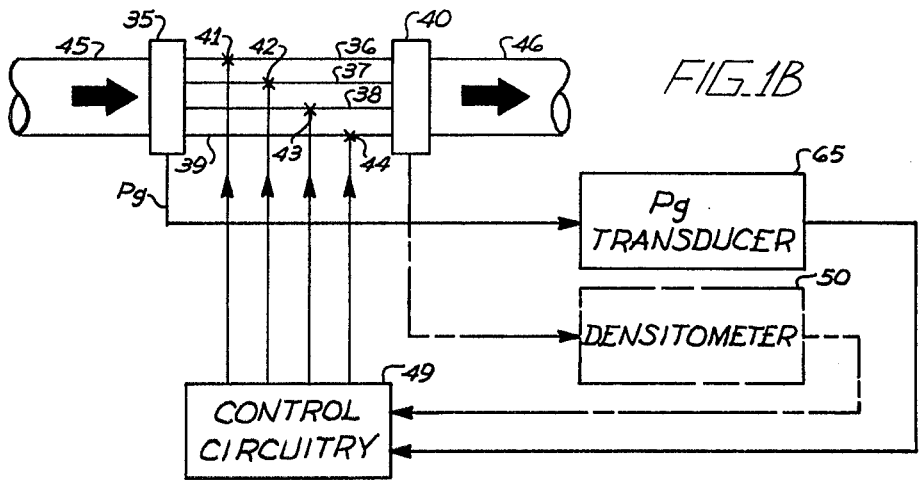
FIG_1B
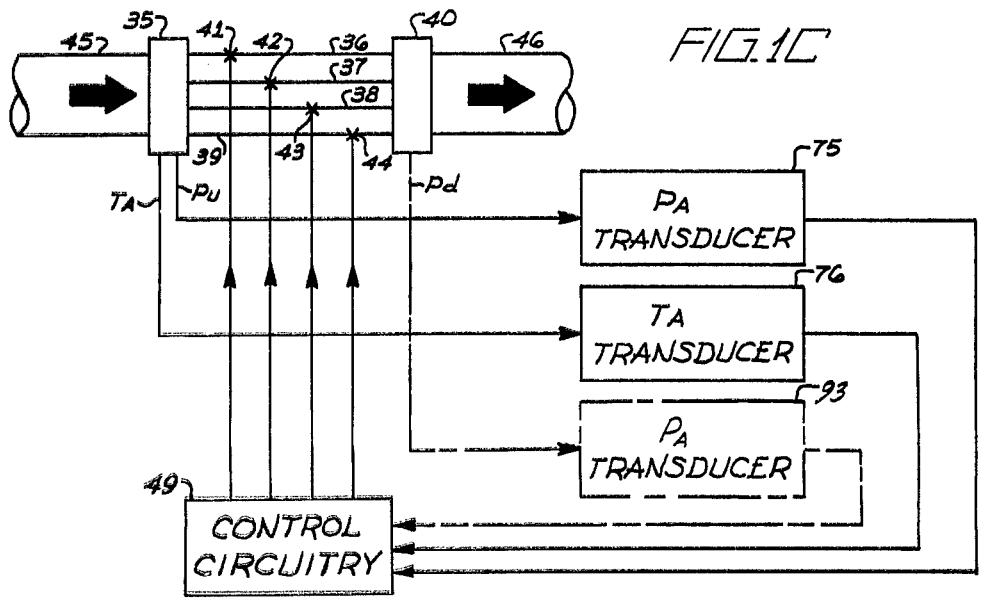
FIG_1C

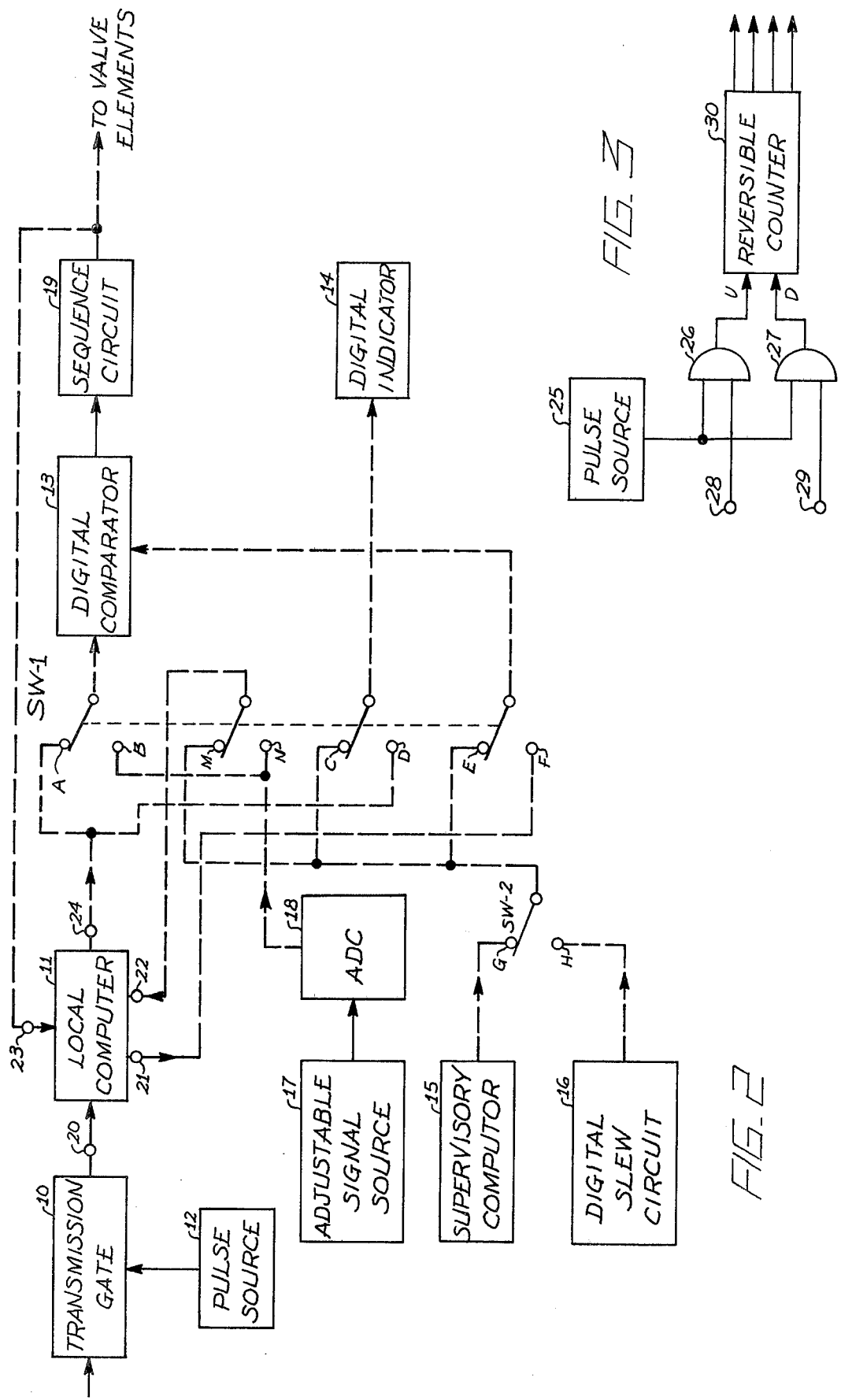

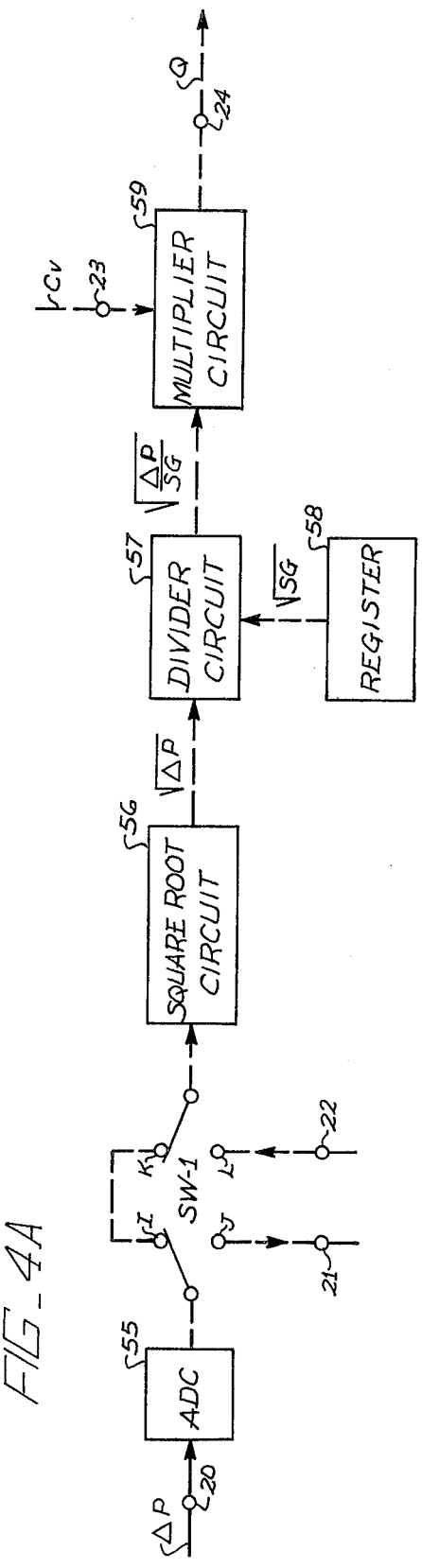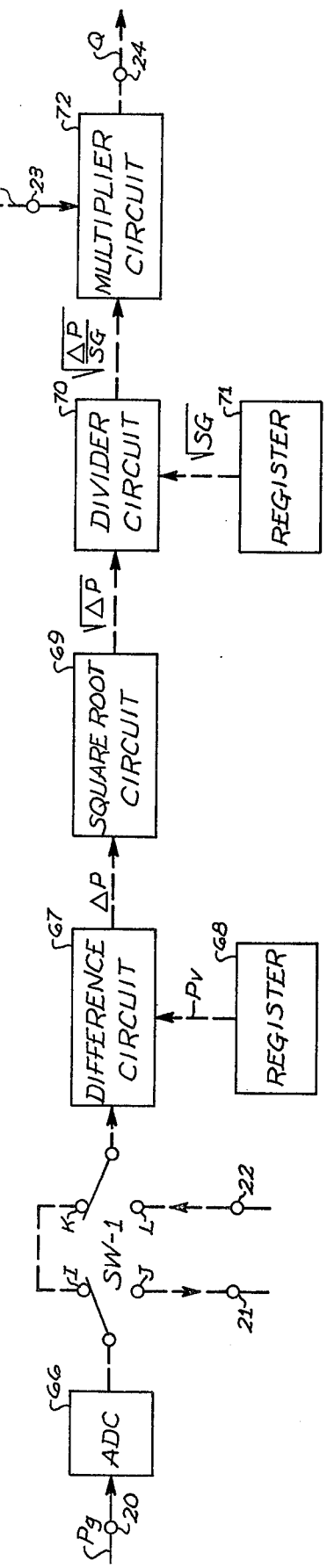

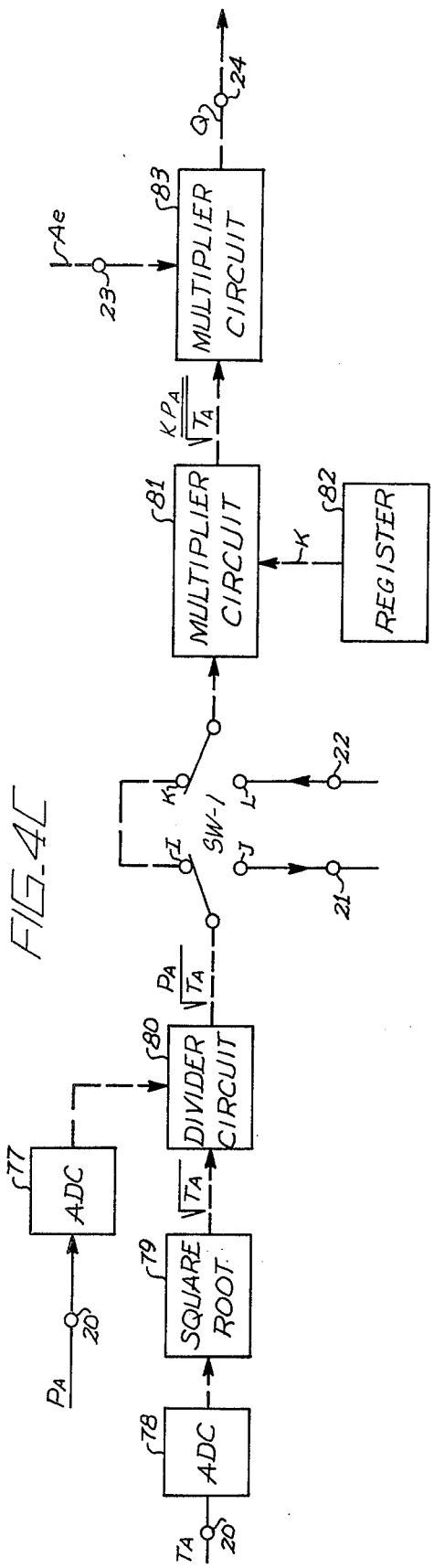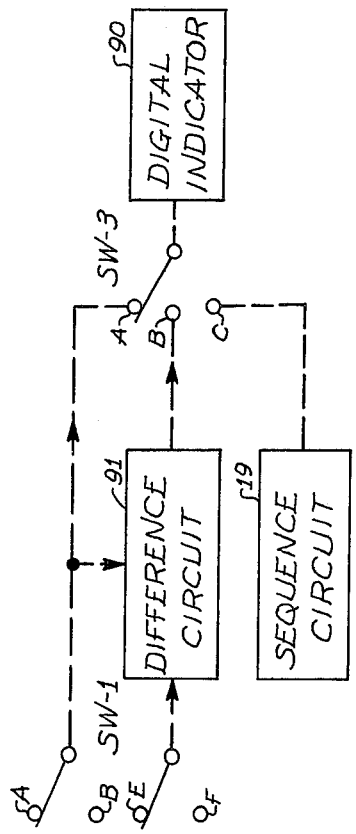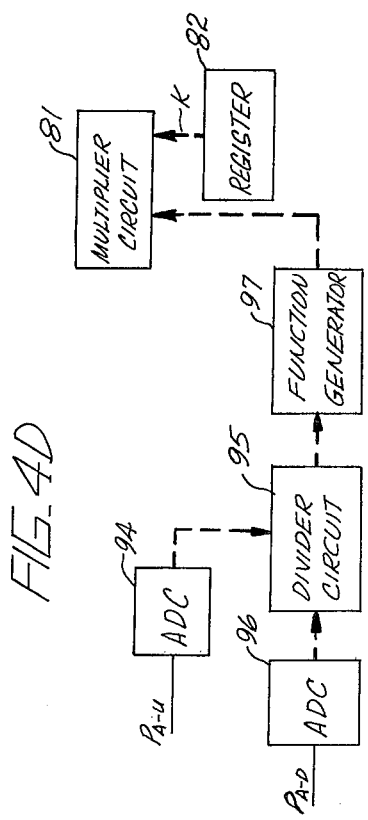

DIGITAL FLUID FLOW RATE MEASUREMENT OR CONTROL SYSTEM

BACKGROUND OF THE INVENTION

This invention relates to the measurement or control of fluid flow rate and, more particularly, to the application of digital techniques thereto.

Conventionally, fluid flow rate is measured by a flowmeter, such as a venturi meter, an orifice meter, or a turbine meter. In a venturi meter and an orifice meter, the flow rate is proportional to the pressure in a fluid passage having fixed cross-sectional dimensions. In a turbine meter, the flow rate is proportional to the angular velocity at which the turbine rotates. For any particular meter, flow rate is proportional to the measured parameter within a limited range of flow rates. Therefore, to make accurate measurements over a wide range of flow rates, a number of particular meters having different dimensions must often be employed, each covering a segment of the range.

In a conventional analog fluid flow control system, the flow rate is controlled by positioning a plug located in the fluid stream. The degree to which the plug impedes flow governs the flow rate. In order to establish a set point value of flow rate, a flowmeter generates a signal representative of the actual value of flow rate, which is compared with a command signal representative of the set point value, and the plug position is adjusted by a control loop until the actual value corresponds to the set point value. In large oil refineries, chemical plants, and other processing facilities, supervisory digital computers run the operations by issuing set point commands to the individual flow control systems and receiving data concerning the status of the operations. The limited range of present flowmeters mentioned in the preceding paragraph, however, restricts the range of set point values that an analog fluid flow control system can accurately accommodate. Further, it is difficult to derive the actual value of flow rate indirectly by calculation because flow rate depends in part on the effective cross-sectional area of the flow passage which is a complex function of the plug position.

In a digital fluid flow control system, a plurality of individually actuatable, value weighted digital bistable valve elements in parallel interconnect an upstream manifold to a downstream manifold. Each valve element exclusively assumes either an open state in which fluid flows from the upstream manifold through the valve element to the downstream manifold, or a closed state in which no fluid flows from the upstream manifold through the valve element to the downstream manifold. The effective cross-sectional orifice areas of the flow passages through the respective valve elements are weighted according to a binary code, e.g. a geometric progression of two, thereby value weighting the digital valve elements. The valve elements are actuated by binary signals weighted according to the same binary code as the respective valve elements to which they are coupled. The sum of the effective orifice areas of the valve elements in the open state is related to the binary number or value represented by the actuating signals in the binary code. Recent improvements in the design of digital fluid flow control systems have virtually eliminated any interaction between valve elements, i.e., any dependence of the effective orifice area of one valve element upon the states of the other valve elements, and minimized the effect of pressure variations and ambient conditions on effective orifice areas. Consequently, the sum of the effective orifice areas of the open valve elements can be made proportional to the binary number represented by the binary actuating signals to a high degree of accuracy.

SUMMARY OF THE INVENTION

According to the invention, a digital fluid flow control system is employed to measure or control fluid flow rate. A plurality of individually actuatable, value weighted digital bistable valve elements in parallel interconnect an upstream manifold to a downstream manifold. Each valve element exclusively assumes either an open state in which fluid flows from the upstream manifold through the valve element to the downstream manifold, or a closed state in which no fluid flows from the upstream manifold through the valve element to the downstream manifold. The states of the valve elements comprise a binary number representative of the total effective orifice area between the upstream and downstream manifolds, i.e., the sum of the weighted values of the valve elements in the open state. Preferably, means are provided to maintain a linear relationship between the resultant fluid flow rate from the upstream manifold to the downstream manifold and the product of a flow rate determinative fluid parameter times the sum of the weighted values of the digital valve elements in the open state. The fluid parameter is sensed and the states of the digital valve elements are controlled, and a flow rate representative signal is derived from the states of the valve elements and the fluid parameter. In the preferred embodiments, the states of the digital valve elements are controlled partially or wholly responsive to the sensed fluid parameter. The invention may be viewed as functioning as an orifice meter having a plurality of different size orifice plates corresponding to the different possibilities of the sum of the weighted values of the digital valve elements; responsive to the sensed fluid parameter, the "orifice plate" with the appropriate size orifice is selected. The flow rate range of the system can be increased without impairing accuracy by simply adding more valve elements.

If the fluid is incompressible, the sensed parameter is the square root of the pressure difference between the upstream and downstream manifolds. The linear relationship is maintained by establishing a sufficiently low maximum pressure difference to avoid vena contracta effects or by dissipating the vena contractas. In the special case where a cavitating venturi is provided in the flow passage through each valve element to maintain the linear relationship, the sensed parameter is the square root of the difference between the pressure in the upstream manifold and the vapor pressure of the fluid.

If the fluid is compressible, the sensed parameter is the absolute pressure in the upstream manifold divided by the square root of the absolute temperature in the upstream manifold. The linear relationship is maintained by establishing a minimum pressure difference that is sufficiently large so fluid passes through the flow determining orifices of the open valve elements at sonic velocity.

For the preferred embodiment of flow rate measurement, the valve elements are wholly controlled responsive to the fluid parameter such that the value of the sensed fluid parameter remains constant. The value of the measured flow rate is related to the states of the value elements, i.e., the sum of the cross-sectional areas of the valve elements in the open state. Therefore, the binary actuating signals and the constant fluid parameter are multiplied to derive a signal representative of the value of the measured flow rate, which can be displayed by a digital indicator. Accurate measurement over a wide range of flow rates can be accomplished in this manner.

For the preferred embodiment flow rate control, the valve elements are partially controlled responsive to the fluid parameter so the actual flow rate equals a set point flow rate. The value of the actual flow rate is related to the product of the sensed fluid parameter times the sum of the states of the value elements, i.e., the effective orifice areas of the valve elements in the open state. Therefore, the binary actuating signals and the signal representative of the sensed fluid parameter are multiplied to derive a signal representative of the value of the actual flow rate. In this manner, a set point value of flow rate can be accurately established by a control loop over a wide range of flow rates with a minimum of sensing transducers and without complex computations.

BRIEF DESCRIPTION OF THE DRAWINGS

The features of specific embodiments of the best mode contemplated of carrying out the invention are illustrated in the drawings, in which:

FIGS. 1A, 1B and 1C are schematic diagrams of different embodiments of a digital fluid flow rate measurement or control system incorporating the principles of the invention;

FIG. 2 is a schematic diagram of the control circuitry shown in FIGS. 1A, 1B and 1C;

FIG. 3 is a schematic diagram of the sequence circuit shown in FIG. 2;

FIGS. 4A, 4B and 4C are schematic diagrams of the local computer shown in FIG. 2 for the embodiments of FIGS. 1A, 1B and 1C, respectively;

FIG. 4D is a schematic diagram of an alternative version of a portion of the local computer shown in FIG. 2 for the embodiment of FIG. 1C; and FIG. 5 is a schematic diagram of an arrangement for monitoring the operation of the disclosed digital fluid flow rate measurement or control system.

DETAILED DESCRIPTION OF THE SPECIFIC EMBODIMENTS

Reference is made to FIG. 2 for a schematic block diagram of control circuitry used to practice the invention. One or more analog signals representative of a flow rate determinative fluid parameter are coupled by a transmission gate 10 to an input terminal 20 of a local computer 11. A pulse source 12 controls transmission through gate 10. Each time source 12 generates a pulse, the parameter representative analog signal or signals are transmitted to local computer 11. Thus, the value of the parameter is sampled and applied to the input of computer 11 at a rate determined by the frequency of source 12. The heavy broken lead lines in FIG. 2, each represent a plurality of binary signal leads. For the purpose of illustration, it is assumed that each heavy broken lead line and each terminal and switch contact associated therewith represents four binary signal leads weighted according to a binary code comprising a straight geometric progression of 2, i.e., weighted 1, 2, 4 and 8. In practice, there would most likely be many more than four binary signal leads and any binary code could be used. An output terminal 24 of computer 11 (representing four binary signal terminals) is coupled through a contact A of a switch SW-1 (representing four binary signal contacts) to a first input of a digital comparator 13 and is coupled through a contact D of switch SW-1 to a digital indicator 14. An intermediate output terminal 21 of computer 11 is coupled through a contact F of switch SW-1 to a second input of comparator 13. A supervisory computer 15 is coupled through a contact G of a switch SW-2 and a contact E of switch SW-1 to the second input of comparator 13 and is coupled through a contact M of switch SW-1 to an intermediate input terminal 22 of computer 11. Computer 15 is also coupled through contact G of switch SW-2 and contact C of switch SW-1 to indicator 14. Usually the supervisory computer is remotely located from the measurement and control system and oversees the operation of a number of different processes. A digital slewing circuit 16 is coupled through a contact H of switch SW-2 and contact C of switch SW-1 to indicator 14, is coupled through contact H of switch SW-2 and contact M of switch SW-1 to intermediate input terminal 22 of computer 11, and is also coupled through contact H of switch SW-2 and contact E of switch SW-1 to the second input of comparator 13. Circuit 16 could be a four stage counter driven by a pulse source so its four binary output signals continuously step through the 16 states representing each value of the binary code in succession. The output of an adjustable analog signal source 17 is connected to an analog-to-digital converter 18. The output of analog-to-digital converter 18 is coupled through a contact B of switch SW-1 to the first input of comparator 13 and is coupled through a contact N of switch SW-1 to input terminal 22 of computer 11. The output of comparator 13, which indicates whether the value of the binary signals at its first input or the value of the binary sighals at its second input is larger, is connected to a sequence circuit 19. The binary output signals produced by sequence circuit 19 are coupled to an input terminal 23 of computer 11 and to the valve elements of a digital fluid flow rate measurement or control system described below.

A schematic block diagram of sequence circuit 19 is depicted in FIG. 3. The output of a pulse source 25 is connected to one input of each of AND gates 26 and 27. Output terminals 28 and 29 of comparator 13 are connected to the other input of AND gates 26 and 27, respectively. The output of AND gate 26 is coupled to an upcounting lead U of a reversible counter 30. The output of AND gate 27 is connected to a downcounting lead D of counter 30. Counter 39 has four binary stages connected so its four binary output signals step through the 16 states representing each value of the binary code in succession responsive to respective stepping pulses. When the value represented by the binary signals applied to the first input of comparator 13 is larger than the value represented by the binary signals applied to the second input of comparator 13, output terminal 29 of comparator 13 is energized and pulses from source 25 are applied by AND gate 27 to lead D of counter 30 to reduce the value represented by the binary output signals of counter 30. Conversely, when the value represented by the binary signals applied to the second input of comparator 13 is larger than the value represented by the binary signals applied to the first input of comparator 13, output terminal 28 of comparator 13 is energized and the pulses from source 25 are applied by AND gate 26 to input U of counter 30 to increase the value represented by the binary output signals of counter 30.

The operation of the circuitry of FIGS. 2 and 3 is controlled by pulse source 12, which governs the frequency of the samples supplied to local computer 11. Each time a new sample is supplied to computer 11, a new value of flow rate is calculated and sequence circuit 19 assumes a new state. The frequency of source 12 is selected to be sufficiently higher than the rate at which the value of the set point flow rate from supervisory computer 15 varies when the system is controlling flow rate, to permit the circuitry to follow changing set point values, and the frequency of source 12 is also sufficiently high when the system is measuring to give the desired response time. The frequency of pulse source 25 is substantially higher than that of pulse source 12 so that sequence circuit 19 is capable of stepping through all of the 16 states between sampling periods. The frequency of the pulse source driving slewing circuit 16 is preferably variable so that a human operator can control the slew rate.

In FIG. 1A is depicted a digital fluid flow rate measurement or control system for an incompressible fluid, such as water. An upstream fluid manifold 35 is interconnected by fluid flow passages 36, 37, 38 and 39 to a downstream manifold 40. Plugs 41, 42, 43 and 44 are disposed in passages 36, 37, 38, 39, respectively, where they are each positionable in response to an electrical actuating signal exclusively in a first position in which the plug seals an orifice to prevent fluid flow through the passage, or a second position in which the plug unseals the orifice to permit fluid flow through the passage. Each passage and its related plug comprises an individually actuatable, digital bistable valve element. The valve elements are value weighted, i.e., the ratio of their effective cross-sectional orifice areas are equal to the weighting of the respective binary electrical valve actuating signals in a binary code. For the purpose of illustration, it is assumed that the binary code is a straight geometric progression of 2, i.e., 1, 2, 4 and 8. In practice more valve elements would normally be used. Fluid is supplied to manifold 35 by a source in the form of a conduit 45 and removed from manifold 40 by a receiver in the form of a conduit 46. The fluid flows in the direction of the solid arrows.

Although any configuration could be employed for manifolds 35 and 40 and the digital valve elements interconnecting them, it is preferable to employ one of the configurations disclosed in application Ser. No. 111,945, filed Feb. 2, 1971, now U.S. Pat. No. 3,746,041; application Ser. No. 169,930, filed Aug. 9, 1971, now U.S. Pat. No. 3,785,389, or the application Ser. No. 432,153, filed on even date herewith by Harry Friedland and Addison W. Langill, Jr., all of which are assigned to the assignee of the present application. The disclosures of these three applications are incorporated herein by reference. The resultant fluid flow rate from upstream manifold 35 to downstream manifold 40 through all the digital valve elements that are in the open state is expressed by the following equation:

$$Q = C_r \sqrt{\frac{\Delta P}{SP}} \qquad (1)$$

where $Q$ is the mass flow rate of the incompressible fluid, $C_r$ represents the sum of the effective orifice areas of the open valve elements, $\Delta P$ is the difference in static pressure between the fluid in manifolds 35 and 40, and $SG$ is the specific gravity of the fluid. The $C_r$ of each individual valve element is defined as the flow rate ($Q$) of water in gallons per minute (GPM) through such valve element with a pressure difference ($\Delta P$) of one psi; the $C_r$ in equation (1) is the sum of the $C_r$'s of the individual valve elements in the open state. The fluid flow rate determinative parameter is the square root of the pressure difference ($\Delta P$). The linear relationship in equation (1) is maintained in either of two ways. First, there is established a sufficiently low maximum pressure difference ($\Delta P$) to prevent formation of downstream vena contractas having pressure dependent cross-sectional areas. (With reference to the water flow curve of FIG. 5 in a paper by Gordon F. Stiles entitled "Cavitational Tendencies of Control Valves For Paper Pulp Service," which was presented at the 21st Annual Conference of the Instrument Society of America, Oct. 24-27, 1966, in New York, N.Y., the maximum pressure difference should be small enough to operate on the straight portion of the curve for each digital valve element.) Second, if the maximum pressure difference is high enough to form downstream vena contractas having pressure dependent cross-sectional areas then the vena contractas should be dissipated by directing the streams from the different valve elements at each other, as taught in application Ser. No. 64,142, filed Aug. 3, 1970, the disclosure of which is incorporated herein by reference. Thus, the linear relationship is maintained by preventing dependence of $C_r$ upon $\Delta P$. By definition, the specific gravity of an incompressible fluid is a constant at a constant temperature. In practice, the specific gravity of most liquids, which are the fluids regarded as incompressible, does not vary substantially over a wide range of ambient temperature. Accordingly, the flow rate is proportional to the product of the square root of the pressure difference between manifolds 35 and 40 times the binary number representing the sum of the effective orifice areas of the digital valve elements in the open state and the flow rate can be computed therefrom for a specified fluid. Upstream manifold 35 and downstream manifold 40 are fluidically coupled to a differential pressure transducer 47, which generates an electrical analog signal proportional to the pressure difference between manifolds 35 and 40 $P_u - P_d$. This signal is coupled to control circuitry 49, which is discussed above and disclosed in FIG. 2 in detail. Control circuitry 49 generates binary output signals that represent the actual flow rate ($Q$) in the binary code to actuate plugs 41, 42, 43, and 44, respectively, partially or wholly in response to the sensed fluid parameter, i.e., the square root of $P_u - P_d$.

If the specific gravity of the fluid in the system cannot be regarded as constant, a densitometer 50 is coupled between manifold 35 or 40 and control circuit 49, as depicted by phantom lines in FIG. 1A. In this case, the calculation of flow rate by control circuitry 49 takes into account variations in specific gravity of the fluid, and the square root of specific gravity becomes part of the flow rate determinative parameter. In some cases, changes in specific gravity could be measured indirectly by a thermometer, rather than by a densitometer.

For a description of the operation of the system disclosed in FIG. 1A, reference is made to FIG. 2 in which control circuitry 49 is disclosed, and to FIG. 4A in which local computer 11 for the embodiment of FIG. 1A is disclosed. In FIG. 4A, samples of the analog output signal from transducer 48, which occur at a frequency determined by source 12, are applied to an analog-to-digital converter 55 via input terminal 20. Each heavy broken lead line represents four binary signal leads weighted according to the binary code. The output of analog-to-digital converter 55, which represents the pressure difference between manifolds 35 and 40 in the binary code, is coupled through contacts I and K of switch SW-1 to a square root circuit 56. Analog-to-digital converter 55 is coupled through a contact J of switch SW-1 to output terminal 21 and input terminal 22 is coupled through a contact L of switch SW-1 to square root circuit 56. The output of circuit 56, which represents the square root of the pressure difference is coupled to a first input of a divider circuit 57. The output of a register 58, which represents the square root of the specific gravity of the incompressible fluid being handled, is coupled to a second input of divider circuit 57. If densitometer 50 is employed, its output is coupled through an analog-to-digital converter and a square root circuit (not shown) to register 58, to provide an output that varies in accordance with the square root of the specific gravity. The output of divider circuit 57, which represents the square root of the pressure difference divided by the specific gravity, is connected to a first input of a multiplier circuit 59. The output of sequence circuit 19, which comprises the binary signals actuating plugs 41, 42, 43 and 44 and is thus the binary number representative of the sum of the effective orifice areas of the open valve elements, is connected via terminal 23 to a second input of multiplier circuit 59. The output of multiplier circuit 59, which represents the solution of equation (1), i.e., the flow rate from manifold 35 to manifold 40, is coupled via output terminal 24 to contacts A and D of switch SW-1.

When switches SW-1 and SW-2 are in the position shown, contacts A, C, E, G, I, K, and M are closed and the system operates in its set point control mode. Binary signals representing a set point value of flow rate are coupled from supervisory computer 15 to the second input of comparator 13 and to indicator 14. Responsive to the output of comparator 13, sequence circuit 19 counts up or down, thereby increasing or decreasing the flow rate through the valve elements until the binary signals at output terminal 24 of computer 11 are identical to the binary signals from supervisory computer 15. Then, the actual flow rate from manifold 35 to manifold 40 is at the set point value, which is displayed on indicator 14 for monitoring purposes.

When switch SW-2 is placed in the other position, contact H is closed and the system operates in its manual control mode. Digital slew circuit 16 is connected to the second input of comparator 13, and to indicator 14. The binary output signals of circuit 16 change state in sequence so they represent in turn each possible value of flow rate. When indicator 14 displays the desired value of flow rate to be established, a human operator disables circuit 16. Then, sequence circuit 19 actuates the digital valve elements to establish the actual flow rate from manifold 35 to manifold 40 at this value, as described in the preceding paragraph.

When switch SW-1 is placed in the other position, contacts B, D, F, J, L, and N are closed and the system operates in its measurement mode. The output of analog-to-digital converter 55 is connected through contact J (FIG. 4A) and contact F (FIG. 2) of switch SW-1 to the second input of comparator 13. The output of analog-to-digital converter 18 is connected through contact B of switch SW-1 to the first input of comparator 13. As the flow rate from upstream manifold 35 to downstream manifold 40 changes due to external conditions, the pressure difference between manifolds 35 and 40 also changes. Sequence circuit 19 counts up or down responsive to comparator 13 until the pressure difference indicated by transducer 47 equals the magnitude of the signal from source 17. The signal magnitude of source 17 is adjusted to represent a sufficiently large pressure difference $\Delta P$ to cover the entire range of flow rates to be measured. For example, if the fluid is water, the $C_r$ when all the valve elements are open is 15, and the maximum flow rate is 60 GPM, $\Delta P$ is 16 psi according to equation (1). Thus, the signal magnitude of source 17 is adjusted to equal the magnitude of the output signal from transducer 48 for a pressure difference of 16 psi. If the signal magnitude of source 17 is too small, the valve elements are all open before the maximum flow rate is reached and the larger flow rates cannot be measured. Moreover, if the fluid is very viscous, a dependence of $C_r$ upon $\Delta P$ results in a range of very low pressure differences so this should be avoided by operating above such range. If the signal magnitude of source 17 is too large, too few valve elements are open when the maximum flow rate is reached and the full resolving capacity of the measurement system is not utilized.

In FIG. 1B, is depicted another embodiment of a digital fluid flow rate measurement or control system, for an incompressible fluid, such as water. This embodiment is useful when the minimum pressure difference is about 10% of the upstream pressure or greater. The elements in common with the embodiment of FIG. 1A have the same reference numerals. Flow passages 36, 37, 38, and 39 each have a cavitating venturi. Preferably, the valve body configuration and nozzle design disclosed in FIGS. 4 and 5 of the Friedland and Langill application filed on even date herewith is employed. The resultant fluid flow rate from upstream manifold 35 to downstream manifold 40 through all the digital valve elements that are in the open state is expressed by the following equation:

$$Q = C_r \sqrt{\frac{P_a - P_r}{SP}} \qquad (2)$$

where $Q$ is the mass flow rate of the incompressible fluid, $C_r$ represents the sum of the effective orifice areas of the open valve elements and is as defined above in connection with FIG. 1A, $P_a$ is the gauge pressure of the fluid in manifold 35, $P_r$ is the vapor pressure of the fluid, and $SG$ is the specific gravity of the fluid. Since the pressure at the throat of a cavitating venturi is the vapor pressure of the fluid, irrespective of pressure variations in downstream manifold 40, the flow rate is proportional to the product of the square root of the difference between the pressure in manifold 35 and the vapor pressure times the sum of the effective orifice areas of the digital valve elements in the open state, and the flow rate can be computed therefrom for a specified fluid. Thus, the fluid flow rate determinative parameter is the square root of the pressure difference ($P_g - P_v$). The linear relationship in equation (2) is maintained by the cavitating venturis, which eliminate downstream vena contractas by virtue of the controlled fluid divergence in the diverging sections of the venturis. As described in the Friedland and Langill application filed on even date herewith, the maximum $C_v$ of the system must be designed to be small enough vis-a-vis the external "plumbing" to which the system is connected to provide a minimum pressure difference between manifolds 35 and 40, i.e., a pressure difference, when all the valve elements are in the open state, sufficient to sustain cavitation at the throats of the venturis. Upstream manifold 35 is fluidically coupled to a gauge pressure transducer 65, which generates an electrical analog signal proportional to the gauge pressure ($P_g$). This signal is coupled to control circuit 49, which generates binary output signals that represent the actual flow rate ($Q$) in the binary code, to actuate plugs 41, 42, 43 and 44, respectively partially or wholly in response to the sensed fluid parameter, i.e., the square root of $P_g - P_v$. Commercially available gauge pressure transducers generate much less noise than commercially available differential pressure transducers, so, other factors being equal, the embodiment of FIG. 1B is capable of measuring and controlling with greater accuracy than the embodiment of FIG. 1A. It should be noted that in the case of water, the vapor pressure is essentially zero pressure and the sensed fluid parameter simply is the square root of $P_g$. If the specific gravity of the fluid in the system cannot be regarded as constant, a densitometer 50 is coupled between manifold 35 or 40 and control circuit 49, as depicted by phantom lines in FIG. 2A. In this case, the calculation of flow rate by control circuitry 49 takes into account variations in specific gravity of the fluid, and the square root of specific gravity becomes part of the flow rate determinative parameter.

FIG. 4B depicts local computer 11 for the embodiment of FIG. 1A. In FIG. 4B, samples of the analog output signal from transducer 65, which occur at a frequency determined by source 12, are applied to an analog-to-digital converter 66. Each heavy broken lead line represents four binary signal leads weighted according to the binary code. The output of analog-to-digital converter 66, which represents the gauge pressure in manifold 35 in the binary code, is coupled through contacts I and K of switch SW-1 to a first input of a difference circuit 67. The output of analog-to-digital converter 66 is coupled through a contact J of switch SW-1 to output terminal 21 and input terminal 22 is coupled through a contact L of switch SW-1 to the first input of difference circuit 67. The output of a register 68, which represents the vapor pressure of the fluid being handled, is coupled to a second input of difference circuit 67. The output of difference circuit 67, which represents the difference between the gauge pressure in manifold 35 and the vapor pressure of the fluid, is connected to a square root circuit 69. The output of square root circuit 69, which represents the square root of the pressure difference, is connected to a first input of a divider circuit 70. The output of a register 71, which represents the square root of the specific gravity of the fluid being handled, is coupled to a second input of divider circuit 70. If densitometer 50 is employed, its output is coupled through an analog-to-digital converter and a square root circuit (not shown) to register 71, to provide an output that varies in accordance with the square root of the specific gravity. The output of divider circuit 70, which represents the square root of the pressure difference divided by the specific gravity, is connected to a first input of a multiplier circuit 72. The output of sequence circuit 19, which comprises the binary signals actuating plugs 41, 42, 43, and 44 and thus the binary number representing the sum of the effective orifice areas of the open valve elements, is connected via terminal 23, to a second input of multiplier circuit 72. The output of multiplier circuit 72, which represents the solution of equation (2), i.e., the flow rate from manifold 35 to manifold 40, is coupled via output terminal 24 to contacts A and D of switch SW-1 (FIG. 2).

In FIG. 1C is depicted a digital fluid flow rate measurement or control system for a compressible fluid, such as air. The elements in common with the embodiment of FIG. 1A have the same reference numerals. Flow passages 36, 37, 38, and 39 each have a critical flow orifice through which the fluid flows at sonic velocity. Preferably, the configuration with converging-diverging nozzles disclosed in FIG. 1 of the Friedland and Langill application filed on even date herewith is employed. The resultant fluid flow rate from upstream manifold 35 to downstream manifold 40 through all the digital valve elements that are in the open state is expressed by the following equation:

$$w = \frac{kA_eP_A}{\sqrt{T_A}} \quad (3)$$

wherein $w$ is the mass flow rate of the compressible fluid, $k$ is a constant depending on the ratio of specific heats and the gas constant of the fluid, $P_A$ is the absolute static pressure of the fluid in manifold 35, $T_A$ is the absolute temperature of the fluid in manifold 35, $A_e$ is the sum of the effective orifice areas of the open valve elements. Reference is made to the text, *The Dynamics and Thermodynamics of Compressible Fluid Flow*, by Ascher H. Shapiro, Vol. I, page 85, equation (4.17), The Ronald Press Co., N.Y. 1953, for the exact relationship between $k$, the ratio of specific heats, and the gas constant. The effective orifice area $A_e$ of each individual valve element is the value yielded by equation (3) for given values of the other parameters when such valve element alone is open, all other valve elements being closed. The flow rate is proportional to the absolute pressure in manifold 35 divided by the square root of the absolute temperature in manifold 35 times the product of the sum of the effective orifice areas of the digital valve elements in the open state, and the flow rate can be computed therefrom for a specified fluid. Thus, the fluid flow rate determinative parameter is the absolute pressure ($P_A$) divided by the square root of the absolute temperature ($T_A$). The linear relationship in equation (3) is maintained by the critical flow orifices, which eliminate any dependence of flow rate upon the pressure in downstream manifold 40. As described in the Friedland and Langill application filed on even date herewith, the maximum $A_e$ of the system must be designed to be small enough vis-a-vis the external "plumbing" to which the system is connected to provide a minimum pressure difference between manifolds 35 and 40 when all the valve elements are in the open state sufficient to sustain fluid flow at sonic velocity through the critical flow orifices. Upstream manifold 35 is fluidically coupled to a pressure transducer 75, which generates an electrical analog signal proportional to the absolute pressure $P_A$. Similarly, manifold 35 is thermally coupled to an absolute temperature transducer 76, which generates an electrical analog signal proportional to the absolute temperature $T_A$. These signals are coupled to control circuitry 49, which generates binary output signals that represent the actual flow rate ($\dot{W}$) in the binary code, to actuate plugs 41, 42, 43 and 44, respectively, partially or wholly in response to the sensed fluid parameter, i.e., $P_A$ divided by the square root of $T_A$.

FIG. 4C depicts local computer 11 for the embodiment of FIG. 1C. In FIG. 4C samples of the analog output signals from transducers 75 and 76, which occur at a frequency determined by source 12, are applied to analog-to-digital converters 77 and 78, respectively. Each heavy broken lead line represents four binary signal leads weighted according to the binary code. The output of analog-to-digital converter 78, which represents the absolute temperature of the fluid in manifold 35 in the binary code, is coupled through a square root circuit 79 to a first input of a divider circuit 80. The output of analog-to-digital converter 77, which represents the absolute pressure in manifold 35 in the binary code, is coupled directly to a second input of divider circuit 80. The output of divider circuit 80, which represents the absolute pressure divided by the square root of the absolute temperature in manifold 35, is coupled through contacts I and K of switch SW-1 to a first input of a multiplier circuit 81. Divider circuit 80 is coupled through contact J of swithc SW-1 to output terminal 21 and input terminal 22 is coupled through contact L of switch SW-1 to the first input of multiplier circuit 81.

The output of a register 82, which represents the constant ($k$) characteristic of the particular compressible fluid, is coupled to a second input of multiplier circuit 81. The output of multiplier circuit 81, which represents the fluid constant times the absolute pressure divided by the square root of the absolute temperature, is connected to a first input of a multiplier circuit 83. The output of sequence circuit 19, which comprises the binary signals actuating plugs 41, 42, 43, and 44 and thus the binary number representing the sum of the effective orifice areas of the open valve elements, is connected via terminal 23 to a second input of multiplier circuit 83. The output of multiplier circuit 83, which represents the solution of equation (3), i.e., the flow rate from manifold 35 to manifold 40, is coupled via output terminal 24 to contacts A and D of switch SW-1.

In some cases the available pressure is not sufficient to sustain operation of critical flow orifices in the embodiment of FIG. 1C. Thus the linear relationship of equation (3) cannot be maintained. In this case, an absolute pressure transducer 93 is coupled between manifold 40 and control circuitry 49, as represented by the phantom lines in FIG. 1C. This provides an additional input to establish the non-linear relationship between the flow rate and the product of the flow rate determinative parameter and the states of the valve elements.

FIG. 4D is an alternative version of a portion of local computer 11 shown in FIG. 4C. The output of transducer 75 is coupled through an analog-to-digital converter 94 to one input of a divider circuit 95. The output of transducer 93 is coupled through an analog-to-digital converter 96 to the other input of divider circuit 95. The outputs of transducers 75 and 93 are sampled at a rate determined by source 12. Each heavy broken lead line represents four binary signal leads weighted according to the binary code. The output of divider circuit 95, which represents the pressure in the downstream manifold divided by the pressure in the upstream manifold, is connected to the input of a function generator 97. Function generator 97 introduces the well known non-linearity represented by the subsonic portion of the curve in FIG. 4.3 on page 76 of the Shapiro text referenced above. In other words, for an input having a particular value on the abscissa of the curve, the output from function generator 97 has the value of the ordinant of the curve. The output of function generator 97 and the output of register 82 are coupled to respective inputs of multiplier circuit 81 for multiplication with a signal representative of the flow rate determinative parameter, i.e., the absolute stagnation pressure ($P_A$) divided by the square root of the absolute stagnation temperature ($T_A$). The output of multiplier 81 is processed in the manner described above in connection with FIG. 4C, to produce a flow rate representative signal that reflects the nonlinear relationship.

The embodiments of FIGS. 1B and 1C operate in the set point control, manual control, and measurement modes in the same manner described above in connection with the embodiment of FIG. 1A.

In FIG. 5, several functions of control circuitry 49 in FIG. 2 are monitored and displayed on a digital indicator 90. When a contact A of a selector switch SW-3 is closed, indicator 90 displays the value of the first input to comparator 13. When a contact B of switch SW-3 is closed, indicator 90 displays the difference in value between the first and second inputs to comparator 13. When a contact C of switch SW-3 is closed, indicator 90 displays the output of sequence circuit 19.

The ratio of the effective cross-sectional orifice areas of the valve elements could be weighted according to any binary code; for example, they could be weighted to follow a straight geometric progression of two, they could be weighted equally, or they could be weighted so the smaller valve elements follow a geometric progression of two and the larger valve elements are equal. In any case, the binary signals actuating the valve elements are weighted according to the same binary code as the respective valve elements to which they are coupled.

The flow rate measurement or control range of the system can be increased without impairing accuracy by simply adding more valve elements; for example, assuming the valve elements are weighted according to a straight binary progression of two, eight valve elements provide an operating range of 0 to 256 units, 10 valve elements provide an operating range of 0 to 1,024 units, and 12 valve elements provide an operating range of 0 to 4,096 units, where the unit is determined by the $C_v$ or $A_e$ of the valve element with the smallest value in the binary code. In terms of resolution, eight valve elements provide a resolution of 0.4%, 10 valve elements provide a resolution of 0.1%, and 12 valve elements provide a resolution of 0.025%. Accuracy is not impaired as the operating range is expanded because the flow rate remains proportional to the product of the sensed fluid parameter times the sum of the effective orifice areas of the open valve elements. In effect, viewing the invention as an orifice meter, if eight valve elements are employed, there are 255 separate orifice plates, each with a different size orifice; each orifice plate becomes effective at an appropriate flow rate within the range.

The described embodiments of the invention are only considered to be preferred and illustrative of the invention concept; the scope of the invention is not to be restricted to such embodiments. Various and numerous other arrangements may be devised by one skilled in the art without departing from the spirit and scope of this invention. For example, the calculations performed by local computer 11 could be carried out by an analog computer instead of the digital computing circuits depicted in detail in FIGS. 4A, 4B, and 4C or by a programmed digital computer.

Reference is made to the calibration procedure described on pages 11 through 13 of a copending sole application Ser. No. 432,152 of Robert A. Gallatin, filed on even date herewith and assigned to the assignee of the present application by an assignment recorded on even date herewith. The effective orifice area ($C_r$ or $A_e$) of each valve element is individually adjusted in the manner described in the sole Gallatin application to establish the correct value weighting.

What is claimed is:

1. A digital fluid flow rate measurement or control system comprising:
   a source of fluid at a first pressure;
   a fluid receiver at a second pressure lower than the first pressure;
   a plurality of individually actuatable, value weighted digital bistable valve elements interconnecting the source to the receiver, each valve element assuming exclusively either an open state in which fluid flows from the source through the valve element to the receiver or a closed state in which no fluid flows from the source through the valve element to the receiver such that the resultant fluid flow rate from the source to the receiver is a function of the product of a flow rate determinative fluid parameter times the sum of the weighted values of the digital valve elements in the open state;
   means for sensing the fluid parameter and generating a first signal representaitve of the value of the fluid parameter;
   means responsive to the value of the fluid parameter and the states of the digital valve elements for generating a second signal representative of the value of the resultant fluid flow rate; and
   means responsive to one of the signals for controlling the states of the digital valve elements so as to maintain constant the value represented by the one signal.

2. The system of claim 1, in which the fluid is incompressible, the fluid parameter is the square root of the difference between the first and second pressures, and the sensing means senses the square root of the difference between the first and second pressures.

3. The system of claim 1, in which the fluid is incompressible, each digital valve element has a passage from the source to the receiver which includes a converging-diverging nozzle designed to maintain the vapor phase of the fluid at its throat, the fluid parameter is the square root of the difference between the first pressure and the vapor pressure of the fluid, and the sensing means senses the first pressure.

4. The system of claim 1, in which the fluid is compressible, the fluid parameter is the absolute stagnation pressure divided by the square root of the absolute stagnation temperature, the sensing means senses the first pressure and the temperature of the fluid at the source, each digital valve element has a flow passage from the source to the receiver, a flow determining orifice formed in the flow passage, and a region in the flow passage through which the fluid flows at sonic velocity thereby isolating the flow passage upstream of the flow determining orifice from variations in the second pressure.

5. The system of claim 1, in which the fluid is compressible, the fluid parameter is the first pressure divided by the square root of the absolute stagnation temperature, and the sensing means senses the first pressure, the second pressure, and the temperature of the fluid at the source or receiver.

6. The system of claim 1, in which the controlling means comprises means for controlling the states of the valve elements to maintain the value of the fluid parameter constant.

7. The system of claim 6, in which the controlling means additionally comprises:
   a source of a third signal proportional to a desired fluid flow rate from the source to the receiver, and means responsive to the difference between the third and second signals for changing the states of the digital valve elements to reduce such difference.

8. The system of claim 6, additionally comprising an indicator responsive to the controlling means for displaying the states of the valve elements as a measurement of the fluid flow rate.

9. The system of claim 1, in which the controlling means comprises:
   a source of a third signal proportional to a desired fluid flow rate from the source to the receiver, and means responsive to the difference between the third and second signals for changing the states of the digital valve elements to reduce such difference.

10. The system of claim 9, in which the values of the respective digital valve elements are weighted according to a binary code, the third signal comprises a plurality of binary signals equal in number to the digital valve elements and weighted according to the binary code, and the second signal comprises a plurality of binary signals equal in number to the digital valve elements and weighted according to the binary code.

11. The system of claim 1, in which the fluid flow rate through at least some of the respective digital valve elements in the open state are weighted according to a geometric progression of two.

12. The system of claim 1, additionally comprising means for maintaining a linear function relationship between the resultant fluid flow rate and the product.

13. The system of claim 12, in which the valve elements are arranged so the fluid streams flowing through them are directed at each other.

14. The system of claim 1, in which the one signal is the first signal and the value of the fluid parameter is maintained constant by the controlling means.

15. The system of claim 1, in which the one signal is the second signal and the value of the resultant fluid flow rate is maintained constant by the controlling means.

16. The system of claim 1, additionally comprising switching means for alternatively applying to the controlling means the first signal to measure flow rate or the second signal to control flow rate.

17. The system of claim 1, in which the second signal generating means comprises a signal multiplier responsive to the first signal and the states of the digital valve elements.

18. The system of claim 17, in which the sensing and first signal generating means comprises transducer means for generating a signal proportional to the fluid parameter and a function generator for modifying the signal generated by the transducer means.

19. A digital liquid flow rate measurement or control device comprising:
an upstream liquid manifold;
a downstream liquid manifold;
a plurality of at least three individually actuatable, digital valve elements, each valve element having a liquid flow passage leading from the upstream manifold to the downstream manifold, a sealable orifice in the passage, and a bistable plug positionable exclusively in a first state in which the plug seals the orifice to prevent liquid flow through the passage or a second state in which the plug unseals the orifice to permit liquid flow through the passage;
first liquid pressure sensing means located in the upstream manifold;
second liquid pressure sensing means located in the downstream manifold; and
means responsive to the liquid pressure difference sensed by the first and second pressure sensing means and the states of the digital valve elements for generating a signal representative of the resultant fluid flow rate from the upstream manifold to the downstream manifold.

20. The device of claim 19, additionally comprising means for controlling the states of the respective plugs to maintain the liquid pressure difference sensed by the first and second pressure sensing means at a substantially constant value.

21. The device of claim 20, additionally comprising an indicator responsive to the resultant fluid flow rate representative signal for displaying the liquid flow rate from the upstream manifold to the downstream manifold.

22. The device of claim 19, additionally comprising:
a source of a set point signal proportional to a desired liquid flow rate from the upstream manifold to the downstream manifold, and means responsive to the difference between the resultant flow rate representative and set point signals for changing the plug states of the respective digital valve elements to equalize the desired flow rate and the actual flow rate.

23. The device of claim 19, additionally comprising means for maintaining a linear relationship between the resultant flow rate through the valve elements in the second position and the product of the sensed pressure difference times the sum of the effective cross-sectional areas of the valve elements in the second state.

24. A digital liquid flow measurement or control device comprising:
an upstream liquid manifold;
a downstream liquid manifold;
a plurality of at least three individually actuatable, digital valve elements, each valve element having a liquid flow passage leading from the upstream manifold to the downstream manifold, a sealable orifice in the passage, a bistable plug positioned exclusively in a first state in which the plug seals the orifice to prevent liquid flow through the passage or a second state in which the plug unseals the orifice to permit liquid flow through the passage, and a cavitating venturi in the passage at which the liquid remains in its vapor phase when the plug is in the second state;
liquid pressure sensing means located in the upstream manifold; and
means responsive to the liquid pressure sensed by the pressure sensing means and the states of the digital valve elements for generating a signal representative of the resultant fluid flow rate from the upstream manifold to the downstream manifold.

25. The device of claim 24, additionally comprising means for controlling the states of the respective plugs to maintain the liquid pressure sensed by the pressure sensing means at a substantially constant value.

26. The device of claim 25, additionally comprising an indicator responsive to the resultant flow rate representative signal for displaying the liquid flow rate from the upstream manifold to the downstream manifold.

27. The device of claim 24, additionally comprising:
a source of a set point signal proportional to a desired liquid flow rate from the upstream manifold to the downstream manifold, and means responsive to the difference between the resultant flow rate representative and set point signals for changing the plug states of the respective digital valve elements to equalize the desired flow rate and the actual flow rate.

28. A digital gas flow measurement or control device comprising:
an upstream gas manifold;
a downstream gas manifold;
a plurality of at least three individually actuatable, digital valve elements, each valve element having a gas flow passage leading from the upstream manifold to the downstream manifold, a sealable orifice in the passage, a bistable plug positionable exclusively in a first state in which the plug seals the orifice to prevent gas flow through the passage or a second state in which the plug unseals the orifice to permit gas flow through the passage, and a critical flow orifice through which gas flow at sonic velocity is maintained when the plug is in the second state;
absolute gas pressure sensing means located in the upstream manifold,
absolute temperature sensing means located in the upstream manifold; and
means responsive to the absolute pressure sensed by the pressure sensing means divided by the square root of the absolute temperature sensed by the temperature sensing means and the states of the digital valve elements for generating a signal representative of the resultant fluid flow rate from the upstream manifold to the downstream manifold.

29. The device of claim 28, additionally comprising means for controlling the states of the respective plugs to maintain the absolute pressure sensed by the pressure sensing means divided by the square root of the absolute temperature sensed by the temperature sensing means at a substantially constant value.

30. The device of claim 29, additionally comprising an indicator responsive to the resultant flow rate representative signal for displaying the gas flow rate from the upstream manifold to the downstream manifold.

31. The device of claim 28, additionally comprising:
a source of a set point signal proportional to a desired gas flow rate from the upstream manifold to the downstream manifold, and means responsive to the difference between the resultant flow rate representative and set point signals for changing the plug states of the respective digital valve elements to equalize the desired flow rate and the actual flow rate.

32. The device of claim 28, in which the critical flow orifice comprises the throat of a converging-diverging nozzle.

33. A digital gas flow measurement or control device comprising:
an upstream gas manifold;
a downstream gas manifold;
a plurality of at least three individually actuatable, digital valve elements, each valve element having a gas flow passage leading from the upstream manifold to the downstream manifold, a sealable orifice in the passage, and a bistable plug positionable exclusively in a first state in which the plug seals the orifice to prevent gas flow through the passage or a second state in which the plug unseals the orifice to permit gas flow through the passage;
first gas pressure sensing means located in the upstream manifold;
second gas pressure sensing means located in the downstream manifold;
temperature sensing means located in one of the manifolds; and
means responsive to the pressures sensed by the first and second pressure sensing means and the temperature sensed by the temperature sensing means and the states of the digital valve elements for generating a signal representative of the resultant fluid flow rate from the upstream manifold to the downstream manifold.

34. The device of claim 33, additionally comprising means for controlling the states of the respective plugs to maintain the pressure sensed by the first pressure sensing means divided by the square root of the absolute temperature sensed by the temperature sensing means at a substantially constant value.

35. The device of claim 34, additionally comprising an indicator responsive to the resultant flow rate representative signal for displaying the gas flow rate from the upstream manifold to the downstream manifold.

36. The device of claim 33, additionally comprising:
a source of a set point signal proportional to a desired gas flow rate from the upstream manifold to the downstream manifold, and means responsive to the difference between the resultant flow rate representative and set point signals for changing the plug states of the respective digital valve elements to equalize the desired flow rate and the actual flow rate.

37. A method of measuring the flow rate in a fluid line between a source of fluid at a first pressure and a fluid receiver at a second pressure lower than the first pressure, the method comprising the steps of:
interconnecting a plurality of individually actuatable, value weighted digital bistable valve elements in parallel in the fluid line between the source and the receiver, each valve element assuming exclusively either an open state in which fluid flows from the source through the valve element to the receiver or a closed state in which no fluid flows from the source through the valve element to the receiver such that the resultant flow rate through the fluid line is a function of the product of a flow rate determinative fluid parameter times the sum of the weighted values of the digital valve elements in the open state;
sensing the fluid parameter; and
controlling the states of the digital valve elements to maintain the fluid parameter constant as the flow rate through the fluid line varies.

38. The method of claim 37, additionally comprising the step of maintaining a linear function relationship between the resultant flow rate through the valve elements in the open state and the product.

39. A digital fluid flow rate measurement or control system comprising:
a source of fluid at a first pressure;
a fluid receiver at a second pressure lower than the first pressure;
a plurality of individually actuatable, value weighted digital bistable valve elements interconnecting the source to the receiver, each valve element assuming exclusively either an open state in which fluid flows from the source through the valve element to the receiver or a closed state in which no fluid flows from the source through the valve element to the receiver;
means for maintaining a linear relationship between the resultant fluid flow rate from the source to the receiver and the product of a flow rate determinative fluid parameter times the sum of the weighted values of the digital valve elements in the open state;
means for sensing the fluid parameter; and
means responsive to the value of the fluid parameter and the states of the digital valve elements for generating a signal representative of the resultant fluid flow rate.

40. The system of claim 39, additionally comprising means for controlling the states of the valve elements to maintain the value of the fluid parameter constant.

41. The system of claim 39, in which the generating means is responsive to the sensed value of the fluid parameter and the states of the digital valve elements, the system additionally comprising means for controlling the states of the digital valve elements responsive to the signal representative of the resultant fluid flow rate.

42. The system of claim 39, in which the fluid is incompressible, the fluid parameter is the square root of the difference between the first and second pressures, the sensing means senses the square root of the difference between the first and second pressures, and the means for maintaining a linear relationship comprises means for establishing a sufficiently low maximum difference between the first and second pressures to prevent formation of vena contractas having pressure dependent cross-sectional areas downstream of the valve elements in the open state.

43. The system of claim 39, in which the fluid is incompressible, the fluid parameter is the square root of the difference between the first and second pressures, the sensing means senses the square root of the difference between the first and second pressures, and the means for maintaining a linear relationship comprises means for directing the streams from the valve elements in the open state at each other to dissipate the vena contractas.

44. The system of claim 39, in which the fluid is incompressible, the fluid parameter is the square root of difference between the first pressure and the vapor pressure of the fluid, the sensing means senses the first pressure, and the means for maintaining a linear relationship comprises a cavitating venturi in each valve element.

45. The system of claim 39, in which the fluid is compressible, the fluid parameter is the absolute stagnation pressure divided by the square root of the absolute stagnation temperature, the sensing means senses the first pressure and the temperature of the fluid at the source, and the means for maintaining a linear relationship comprises a critical flow orifice in each valve element through which fluid flows at sonic velocity.

46. The system of claim 45, in which the orifice is the throate of a converging-diverging nozzle.

47. A method for operating a digital fluid flow control system having a plurality of individually actuatable, value weighted digital bistable valve elements interconnecting a source of fluid at a first pressure to a receiver at a second pressure lower than the first pressure, each valve element assuming exclusively either an open state in which fluid flows from the source through the valve element to the receiver or a closed state in which no fluid flows from the source through the valve element to the receiver such that the resultant fluid flow rate from the source to the receiver is a function of the product of a flow rate determinative fluid parameter times the sum of weighted weighthed values of the digital valve elements in the open state, the method comprising the steps of:

sensing the fluid parameter and generating a first signal representative of the value of the fluid parameter;

generating a second signal representative of the product of the value of the fluid parameter and the states of the digital valve elements; and controlling the states of the digital valve elements responsive to one of the signals so as to maintain constant the value representated by the one signal.

* * * * *